(12) United States Patent
Benayad-Cherif

(10) Patent No.: US 8,934,668 B2
(45) Date of Patent: Jan. 13, 2015

(54) METHOD OF MEASURING THE OUTLINE OF A FEATURE

(75) Inventor: Faycal Benayad-Cherif, Lexington, MA (US)

(73) Assignee: Videojet Technologies Inc., Wood Dale, IL (US)

( * ) Notice: Subject to any disclaimer, the term of this patent is extended or adjusted under 35 U.S.C. 154(b) by 208 days.

(21) Appl. No.: 13/496,312

(22) PCT Filed: Sep. 17, 2010

(86) PCT No.: PCT/US2010/049201
§ 371 (c)(1),
(2), (4) Date: Mar. 15, 2012

(87) PCT Pub. No.: WO2011/035078
PCT Pub. Date: Mar. 24, 2011

(65) Prior Publication Data
US 2012/0170813 A1    Jul. 5, 2012

Related U.S. Application Data

(60) Provisional application No. 61/243,280, filed on Sep. 18, 2009.

(51) Int. Cl.
*G06K 9/00*     (2006.01)
*G06T 7/60*     (2006.01)
*G06K 9/20*     (2006.01)

(52) U.S. Cl.
CPC ............ *G06T 7/602* (2013.01); *G03T 7/0004* (2013.01); *G06K 9/2036* (2013.01); *G06T 2207/20221* (2013.01)

USPC .......................................................... 382/103

(58) Field of Classification Search
CPC ..... G06K 9/2036; G06T 7/602; G06T 7/0004
USPC .......................................................... 382/103
See application file for complete search history.

(56) References Cited

U.S. PATENT DOCUMENTS

2003/0197906 A1* 10/2003 Furuta et al. ................ 359/15
2007/0014461 A1* 1/2007 Singh et al. .................. 382/128
2007/0160274 A1* 7/2007 Mashiach ..................... 382/128

OTHER PUBLICATIONS

Laser Systems: Engrave, Texture, Mark, Frost and Smooth with one Tool. Linda McIntosh.2008.*
McIntosh, Linda, Laser Systems: Engrave, Texture, Mark, Frost and Smooth with one Tool, MoldMaking Technology Jan. 2008, retrieved Mar. 14, 2012, from [www.foba .de/uploads/media/MMT_01-08.pdf].

* cited by examiner

*Primary Examiner* — Stephen R Koziol
*Assistant Examiner* — Delomia Gilliard
(74) *Attorney, Agent, or Firm* — Joseph A. Yosick

(57) ABSTRACT

A method of measuring an outline of a feature on a surface includes providing a substrate. The substrate includes a feature on a surface of the substrate. The feature includes walls. The surface of the substrate is illuminated. Edges of the walls are illuminated to measure a first contour and a second contour of the feature. An outline of the feature is calculated based on the first contour and the second contour.

14 Claims, 2 Drawing Sheets

The green contour represents the median between the outer and inner contours

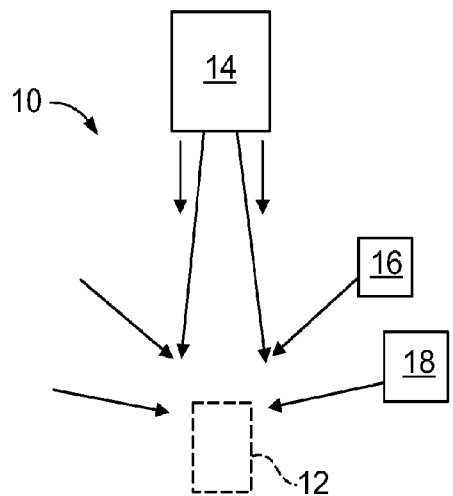
FIG. 1
Lighting A: Walls with high slope
FIG. 2A
Lighting B: Walls with low slope
FIG. 2B
Combined images
FIG. 2C

Engraved character illuminated. The red contours represent the outer and inner contours.

The green contour represents the median between the outer and inner contours

Middle outline extracted from the inner and outer contours

METHOD OF MEASURING THE OUTLINE OF A FEATURE

RELATED APPLICATIONS

This application claims priority under 35 U.S.C. §371 from PCT Application No. PCT/US2010/049201, filed in English on Sep. 17, 2010, which claims the benefit of U.S. Provisional Application No. 61/243,280 filed Sep. 18, 2009, the disclosures of both of which are incorporated herein be reference in their entireties.

BACKGROUND

The present disclosure relates to a method of measuring an outline of a feature on a surface, such as an engraving.

It has found that a hubbing process used to manufacture dies for coins was not as repeatable and accurate as previously thought. Depending of the equipment, the material properties, or the operator, features stamped on a die will move in an unpredictable way. Two dies that are manufactured at different times on the same machine by the same operator will look different. The difference is amplified if the operator is replaced or if the process is achieved on a different machine.

BRIEF SUMMARY

The present disclosure provides a method of measuring an outline of a feature on a surface, such as an engraving on a die, such that the process is repeatable.

In one aspect, a method of measuring an outline of a feature on a surface includes providing a substrate. The substrate includes a feature on a surface of the substrate. The feature includes walls. The surface of the substrate is illuminated. Edges of the walls are illuminated to measure a first contour and a second contour of the feature. An outline of the feature is calculated based on the first contour and the second contour.

In another aspect, a system for measuring an outline of a feature on a surface includes first and second illumination sources disposed to illuminate a feature on a surface of the substrate at a first and second angle. Am imaging device is used for imaging edges of the walls to measure a first contour and a second contour of the feature. A processor is used for calculating an outline of the feature based on the first contour and the second contour.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 1 is a schematic view of a system for measuring an outline of a feature on a surface.

FIG. 2A shows features of a surface under a first illumination condition.

FIG. 2B shows features of a surface under a second illumination condition.

FIG. 2C shows the combined images of FIGS. 2A and 2B.

DETAILED DESCRIPTION

Figure 3A:
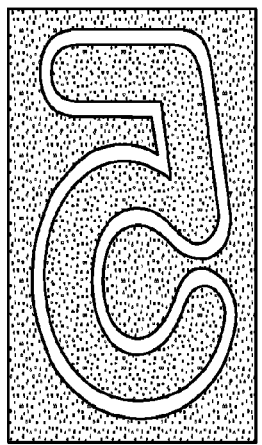
FIG. 3A shows the first and second contours of a feature.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

The present disclosure provides method of measuring an outline of a feature on a surface, such as an engraving on a die. The method only needs two-dimensional imaging and does not need to physically contact the surface.

In the process of creating a die (used, for example, in stamping coins), the engraving on the die needs to be imaged so that certain features may be frosted, for example. The frosting process consists in generating a layout of the frosting pattern that will lie on the die. This pattern is generated by digitizing the plaster of the die used to create the master die.

If manufacturing processes were defect-free, the frosting pattern would line up perfectly to the die. Unfortunately, in most cases, frosting patterns and dies never precisely match. The mint has to tweak every frosting to match a set of dies. The process is based on trial and error and can take several hours, requires someone familiar with a CAD package, the laser software and the laser hardware. Thus, there is a need for a quicker and easier way to generate a frosting pattern that matches dies with high accuracy.

FIG. 1 illustrates a system 10 for measuring an outline of a feature on a surface 12. A first illumination source 16 is disposed to illuminate a feature on a surface of the substrate 12 at a first angle. A second illumination source 18 is disposed to illuminate a feature on a surface of the substrate 12 at a second angle. The second illumination source 18 may simply be the first illumination source 16 moved to a different position. An imaging device 14, such as a laser, may be used for imaging edges of the walls of the feature on surface 12 to measure a first contour and a second contour of the feature. A processor is used for calculating an outline of the feature based on the first contour and the second contour. The processor may be any suitable processor, such as those provided in conventional personal computers.

In brief, the present disclosure provides a method of measuring an outline of a feature on a surface. The substrate includes a feature on a surface of the substrate. The feature includes walls extending from the surface of the substrate. The surface of the substrate is illuminated with a light source and the edges of the walls are imaged to measure a first contour and a second contour of the feature. An outline of the feature is calculated based on the first contour and the second contour.

Contours of engraved surfaces are walls of different angles that can vary between 10 and 85 degrees. To accommodate the different surface angles, the present process uses different lighting structures, each one giving a different angle of illumination. Each illumination structure provides an image of certain engraved walls. By combining images from the different lighting structures, an image with significant details is generated. The lighting is based on a combination of circular light sources. The lighting comes from different angles which enables light reflection off different surfaces and makes them visible.

In FIGS. 2A and 2B, two images are generated based on two lighting configurations. The contours of the images may be generated using intelligent mark positioning (IMP), a process known in the art. The two images are then added and thresholded. FIG. 2C is the resulting combined image. The new image, rich in details, can be used to extract information on the engraved content. Extracting the engraved features is based on a segmentation process that traces the edges of illuminated walls. From these surfaces are extracted an inner contour and an outer contour that are then processed to generate an outline. The outline is disposed between the first contour and the second contour. The outline may be disposed generally equidistant from the first contour and the second contour. The outline is used to determine the area of the feature to frost and represents the contour the laser will follow when tracing the graphical content. In the case of the mint application, the extracted contour is hatched, aligned and marked on the part.

The steps of imaging the edges of the walls and calculating an outline do not require contact with the substrate. The steps of imaging the edges of the walls may be performed by a laser. The steps of imaging the edges of the walls and calculating an outline can be done relatively quickly, especially compared to conventional techniques such as 3D scanning technology. The imaging process generally takes less than 10 minutes, preferably less than 5 minutes. The accuracy of the measured images is preferably within 20 microns. The process may be automated and requires no human intervention.

Figure 3B:
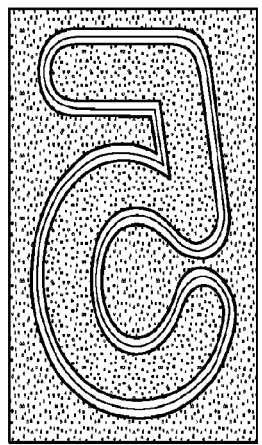
FIG. 3B shows an outline of the feature of FIG. 3A based on the first and second contours.
Figure 3C:
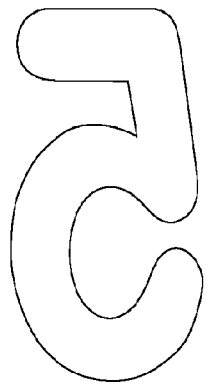
FIG. 3C shows the outline of FIG. 3B extracted from the contours.

The imaging process is illustrated in FIG. 3. In this case, the feature on the surface is the numeral "5". The bright surfaces in FIG. 3A represent the walls of the character. The red (outer) contours represent the edges of the upper and lower surfaces obtained by the imaging technique. The green outline (between the red outlines) in FIG. 3B represents the median of the red contours. As shown in FIG. 3C, the green outline is extracted from the inner and outer contours to provide a pattern for the frosting process to follow.

Figure 4A:
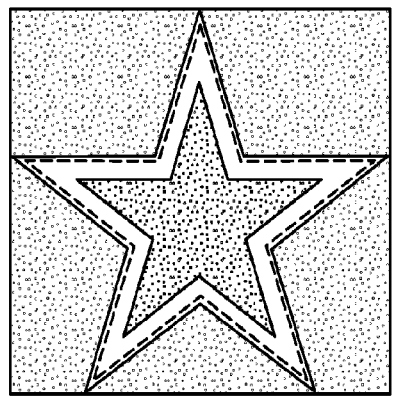
FIG. 4A shows the contour of a surface in a first configuration.
Figure 4B:
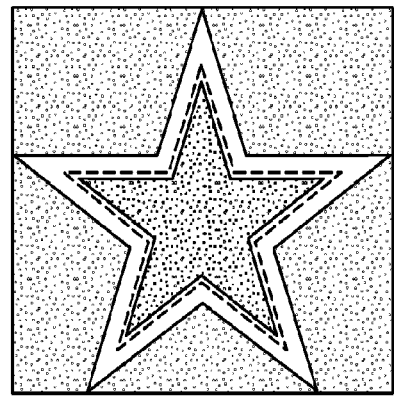
FIG. 4B shows the contour of a surface in a second configuration.

As shown in FIGS. 4A and 4B, the current process is able to control the location of the outline on the walls of the engraved surface. The process can be programmed to track both contours (inner and outer) while maintaining a fixed distance ratio to the outer contour or the inner one. In FIG. 4A, the calculated outline (shown by the dashed line) is closer to the outer contour. In FIG. 4B, the calculated outlines is closer to the inner contour.

Figure 5:
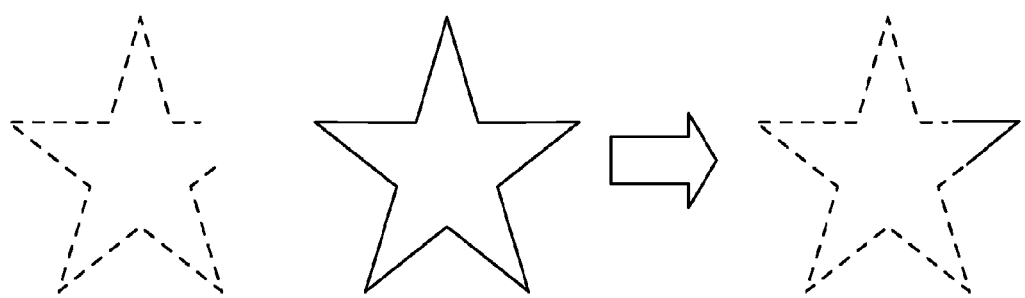
FIG. 5 illustrates a method of closing an outline with missing information.

In some cases, where the edge information is missing due to low angled surfaces, the outline may end up incomplete. For example, as shown in FIG. 5, data on the outline of a portion of the edge of the star is missing. Computer data representing the surface of the substrate (such as CAD data from the design process) may be used to help complete the image. To close outlines, the present process uses the CAD information of the engraved pattern. The example below demonstrates how the outline is patched.

As a first step, the imaging process (which may use IMP) will look for open outlines that are too large to close automatically. The process uses a registration approach that aligns the extracted outline information to the CAD data. Next, an XOR algorithm generates the missing data which is added to the open outline. The missing data and the extracted outline are then joined, as shown on the right. Matching the extracted outline and the missing information is established by fitting the curvature information at both ends of the added data. Thus, the process may be used to complete an outline when at least some edge information is missing.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

What is claimed is:

1. A method of measuring an outline of a feature on a surface, comprising:
   providing a substrate, the substrate comprising a feature on a surface of the substrate, the feature comprising walls;
   illuminating the surface of the substrate;
   imaging edges of the walls to measure a first contour and a second contour of the feature; and
   calculating an outline of the feature based on the first contour and the second contour.

2. The method of claim 1 wherein imaging the edges of the walls comprises using intelligent mark positioning.

3. The method of claim 1 wherein the outline is disposed between the first contour and the second contour.

4. The method of claim 2 wherein the outline is disposed generally equidistant from the first contour and the second contour.

5. The method of claim 1 further comprising using the outline to determine an area of the feature to frost.

6. The method of claim 5 further comprising frosting the area.

7. The method of claim 1 wherein the steps of imaging the edges of the walls and calculating an outline do not require physical contact with the substrate.

8. The method of claim 1 wherein the steps of imaging the edges of the walls are performed by an imaging device.

9. The method of claim 8 where the imaging device is a laser.

10. The method of claim 1 wherein the steps of imaging the edges of the walls and calculating an outline takes less than 10 minutes.

11. The method of claim 1 wherein the step of illuminating the substrate comprises illuminating the substrate a first time, and wherein the step of imaging the edges of the walls comprises imaging the edges of the walls a first time, further comprising illuminating the substrate a second time and imaging the edges of the walls a second time.

12. The method of claim 1, further comprising:
   providing computer data of the surface of the substrate;
   using the computer data to calculate the outline of the feature on the surface of the substrate.

13. A system for measuring an outline of a feature on a surface, comprising:
   a first illumination source disposed to illuminate a feature on a surface of the substrate at a first angle;

a second illumination source disposed to illuminate a feature on a surface of the substrate at a second angle;
an imaging device for imaging edges of the walls to measure a first contour and a second contour of the feature; and
a processor for calculating an outline of the feature based on the first contour and the second contour.

14. The system of claim 13 wherein the imaging device is a laser.

* * * * *